US007244317B2

(12) United States Patent
Singh Gaur

(10) Patent No.: US 7,244,317 B2
(45) Date of Patent: Jul. 17, 2007

(54) DISPENSIBLE BRAZING PASTE

(75) Inventor: Raj Pal Singh Gaur, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 11/160,539

(22) Filed: Jun. 28, 2005

(65) Prior Publication Data
US 2005/0211017 A1 Sep. 29, 2005

(51) Int. Cl.
*B23K 35/24* (2006.01)

(52) U.S. Cl. ...................................................... 148/23

(58) Field of Classification Search ................ 148/23; 228/248.5; 75/255
See application file for complete search history.

(56) References Cited

U.S. PATENT DOCUMENTS

| 3,520,704 | A | * | 7/1970 | Goodman .................... 75/231 |
| 3,637,431 | A | * | 1/1972 | Brenneman et al. ..... 428/318.4 |
| 3,986,899 | A | * | 10/1976 | Kole et al. .................... 148/24 |
| 4,041,436 | A | * | 8/1977 | Kouchich et al. ............. 338/21 |
| 4,069,465 | A | * | 1/1978 | Kouchich et al. ............. 338/20 |
| 4,093,017 | A | * | 6/1978 | Miller et al. ................... 164/28 |
| 4,247,500 | A | * | 1/1981 | Dixon et al. ................. 264/612 |
| 4,267,065 | A | * | 5/1981 | Johnson et al. ........... 252/62.62 |
| 4,418,327 | A | * | 11/1983 | Palilla et al. ................ 338/309 |
| 5,133,129 | A | * | 7/1992 | Thomson, Jr. ................ 29/600 |
| 5,226,974 | A | * | 7/1993 | Conn .......................... 148/23 |
| 5,417,887 | A | * | 5/1995 | Skeele ......................... 516/33 |
| 5,443,658 | A | * | 8/1995 | Hermanek .................... 148/23 |
| 5,450,666 | A | * | 9/1995 | Conn et al. ............. 29/890.043 |
| 6,059,174 | A | * | 5/2000 | Kojima et al. .............. 228/183 |
| 6,156,130 | A |  | 12/2000 | Hegner et al. ................ 148/24 |
| 6,514,894 | B1 | * | 2/2003 | Adair et al. ................. 501/134 |
| 6,624,225 | B1 | * | 9/2003 | Ellison et al. .............. 524/434 |
| 6,656,290 | B1 | * | 12/2003 | Koch et al. ................... 148/24 |
| 6,667,112 | B2 | * | 12/2003 | Prasad et al. ............... 428/552 |
| 2004/0229053 | A1 | * | 11/2004 | Ahluwalia et al. .......... 428/457 |

FOREIGN PATENT DOCUMENTS

| JP | 56-095489 | * | 8/1981 |
| SU | 1659189 A1 | * | 6/1991 |
| SU | 1823327 A1 | * | 9/1996 |

OTHER PUBLICATIONS

English abstract of SU 1659189, patent publication date Jun. 1991.*
English abstract of SU 1823327, patent publication date Sep. 1996.*
English abstract of JP 56-095489, patent published Aug. 1981.*

* cited by examiner

*Primary Examiner*—Roy King
*Assistant Examiner*—Kathleen McNelis
(74) *Attorney, Agent, or Firm*—Robert F. Clark

(57) ABSTRACT

A dispensable brazing paste useful in lamp manufacturing includes a brazing powder and a water soluble vehicle that has water, glycerin, a binder, and a dispersant that includes ammonium stearate and ammonium citrate. Preferably, the brazing powder is 84-87 wt % of the paste, the water is 3-5 wt %, the glycerin is 3-4 wt %, the binder is 1-2 wt %, and the dispersant is 4-6 wt %, and a weight of the water is within a range of 60-90% of a weight of the dispersant. The brazing paste does not include the troublesome organic solvents of the prior art.

1 Claim, 2 Drawing Sheets

DISPENSIBLE BRAZING PASTE

BACKGROUND OF THE INVENTION

The present invention is directed to a composition of a brazing paste that is useful in lamp manufacturing, and to brazing method using the paste.

Brazing is a process that bonds materials by melting filler that is placed between the materials being bonded. The filler may come in various forms, with a particularly useful form being a paste that is dispensable (meaning that it can be applied, for example, by screen printing or with a nozzle and retain its shape and not flow away).

U.S. Pat. No. 6,156,130 describes a dispensable brazing paste that includes a brazing powder and an organic vehicle that includes a polymer in an organic solvent. However, organic solvents are difficult and expensive to use because they must be handled with particular care.

Accordingly, it would be helpful to provide a brazing paste that does not use organic solvents.

SUMMARY OF THE INVENTION

An object of the present invention is to provide a novel brazing paste that does not include an organic solvent and thereby avoids the problems of the prior art.

A further object of the present invention is to provide a novel brazing paste useful in lamp manufacturing that includes a brazing powder and a water soluble vehicle that has water, glycerin, a binder, and a dispersant that includes ammonium stearate and ammonium citrate. Preferably, the brazing powder is 84-87 weight percent (wt %) of the paste, the water is 3-5 wt %, the glycerin is 3-4 wt %, the binder is 1-2 wt %, and the dispersant is 4-6 wt %, and a weight of the water is within a range of 60-90% of a weight of the dispersant.

A yet further object of the present invention is to provide a novel method of brazing with this brazing paste.

These and other objects and advantages of the invention will be apparent to those of skill in the art of the present invention after consideration of the following drawings and description of preferred embodiments.

DESCRIPTION OF PREFERRED EMBODIMENTS

An embodiment of the brazing paste of the present invention includes a brazing powder and a water soluble vehicle that has water, glycerin, a binder, and a dispersant that includes ammonium stearate and ammonium citrate. The dispersant may also include polyethylene glycol (preferably with 400 molecular weight, PEG-400).

Figure 1:
FIG. 1 is an SEM photograph of a brazing powder usable in the present invention.

In a preferred embodiment, the brazing powder is 84-87 wt % of the paste, the water is 3-5 wt %, the glycerin is 3-4 wt %, the binder is 1-2 wt %, and the dispersant is 4-6 wt %. More particularly, a weight of the water is at least half a weight of the dispersant and yet more particularly within a range of 60-90% of a weight of the dispersant. The brazing powder may be a mixture of copper, tin, alloys thereof, and glass. FIG. 1 shows an SEM of a brazing powder usable in the present invention. The scale at the bottom of FIG. 1 is 300 μm in width.

When the dispersant includes polyethylene glycol, the paste may have generally equal weight percentages of ammonium stearate, ammonium citrate, and polyethylene glycol.

A further embodiment of the invention is a method of brazing that includes the steps of applying this brazing paste to at least one of two surfaces that are to be joined by brazing, and brazing the two surfaces together. The method may be used in lamp manufacturing.

EXAMPLES

A series of samples of paste were made and a summary of these samples is shown in Table 1. The pastes prepared in Runs #3 and 15 were dispensable and the paste of Run #3 was the best.

Run #3 was a dispensable paste with suitable viscosity behavior obtained by mixing 4 g of a low molecular weight dispersant, namely ammonium stearate (suspension), 4 g of an additional dispersant, namely PEG 400, and 4 g of another dispersant, namely ammonium citrate in 8-10 g water, then adding 180 g of brazing powder and mixing well with a spatula, adding 8 g glycerin (lubricant) during mixing, mixing the contents with a mixer for 1 hour, adding 2-4 g of a binder, namely hydroxypropyl methyl cellulose (HPMC), with additional 1-hour mixing with the mixer.

In another example not shown in Table I, the paste of Run #3 was reformulated to include 4 g sodium citrate and 0.0 g ammonium stearate. This paste did not dispense.

Figure 2:
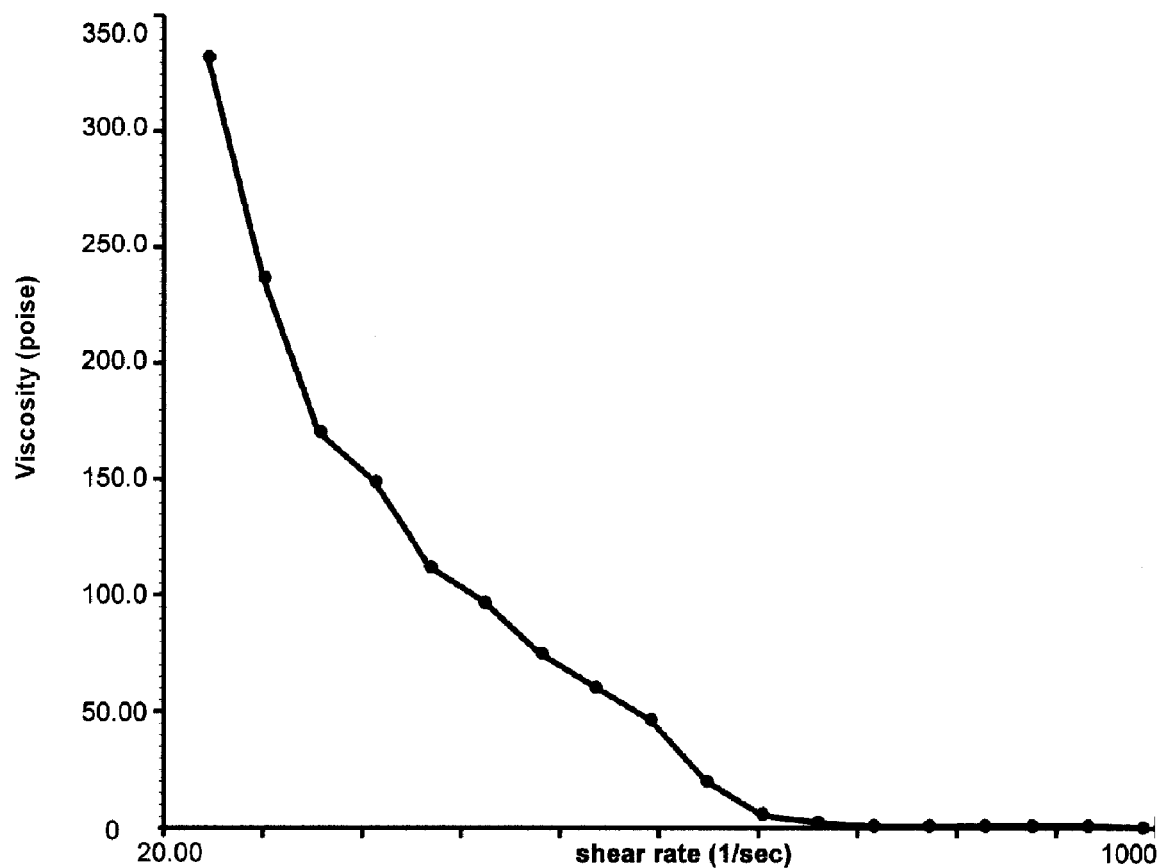
FIG. 2 is a graph showing the viscosity of a paste of one embodiment of the present invention.

The paste of Run #3 was very good in dispensing. Another paste of Run #3, except with 2 g HPMC (instead of 4 g) was also good. Both pastes, the one made in Run #3, as in Table 1, and the paste of Run #3 made with 2 g HPMC, kept wet and dispensable for more than one year. The viscosity of paste made according to Run #3 compositions was 25-30 K cp as shown in FIG. 2.

TABLE I

| Run # | AS (g) | PEG-400 (g) | Am-Cit (g) | BP (g) | Water (g) | Glycerin (g) | HPMC (g) |
|---|---|---|---|---|---|---|---|
| 1 | 8 | 0 | 6 | 180 | 0 | 8 | 6 |
| 2 | 8 | 8 | 2 | 180 | 0 | 8 | 2 |
| 3 | 4 | 4 | 4 | 180 | 8 | 8 | 4 |
| 4 | 0 | 0 | 6 | 180 | 8 | 8 | 6 |
| 5 | 0 | 0 | 2 | 180 | 16 | 8 | 2 |
| 6 | 8 | 0 | 6 | 180 | 4 | 8 | 2 |
| 7 | 8 | 0 | 2 | 180 | 4 | 8 | 6 |
| 8 | 0 | 8 | 6 | 180 | 0 | 8 | 6 |
| 9 | 8 | 8 | 2 | 180 | 0 | 8 | 6 |
| 10 | 0 | 8 | 6 | 180 | 4 | 8 | 2 |
| 11 | 4 | 4 | 4 | 180 | 4 | 8 | 4 |
| 12 | 8 | 8 | 6 | 180 | 0 | 8 | 2 |
| 13 | 0 | 0 | 6 | 180 | 12 | 8 | 2 |
| 14 | 0 | 8 | 2 | 180 | 4 | 8 | 6 |
| 15 | 8 | 0 | 2 | 180 | 8 | 8 | 2 |
| 16 | 8 | 8 | 6 | 180 | 0 | 8 | 6 |
| 17 | 0 | 8 | 2 | 180 | 8 | 8 | 2 |
| 18 | 0 | 0 | 2 | 180 | 12 | 8 | 6 | where, AS=ammonium stearate; PEG-400=polyethylene glycol with 400 molecular weight, Am-Cit =ammonium citrate, BP=brazing powder, and HPMC=hydroxypropyl methyl cellulose.

The procedure followed was generally:

weigh AS liquid and PEG-400, Am-Cit and water in a container and mix well, add 180 g BP and mix with a spatula,
add 8 g Glycerin and mix well again using a spatula,
mix using the mixer for 1 hour,
add HPMC binder (as per Table I),
mix for 1 hour, and
collect pastes in polyethylene bottles.

Pastes from Runs #3 and 15 included a brazing powder of finely dispersed glass and copper and tin metals and alloys thereof that are useful for electric lamp applications. These pastes had the desired viscosity for use in electric lamp fabrication.

The data in Table I show that un-dispensable pastes were formed when the weight of water in the paste was much less than or much more than the weight of dispersant (the sum of the weights of AS, PEG-400 and Am-Cit). A suitable paste was achieved when the weight of the water was slightly less than the weight of the dispersants, with a water weight of 60-90% of the dispersant weight being preferred, and AS was included in the dispersant.

While embodiments of the present invention have been described in the foregoing specification and drawings, it is to be understood that the present invention is defined by the following claims when read in light of the specification and drawings.

What is claimed is:

1. A brazing paste comprising:
a brazing powder that is a mixture of copper-tin alloy and glass; and
a water soluble vehicle that comprises water, glycerin, a binder, and a dispersant that consists essentially of ammonium stearate, ammonium citrate, and polyethylene glycol in generally equal weight percentages,
wherein the brazing powder is 84-87 wt % of the paste, the water is 3-5 wt %, the glycerin is 3-4 wt %, the binder is 1-2 wt %, and the dispersant is 4-6 wt %, and
wherein the weight of the water is within a range of 60-90% of the weight of the dispersant.

* * * * *